United States Patent [19]

Koerfer

[11] 4,398,830
[45] Aug. 16, 1983

[54] APPARATUS FOR DISCHARGING FOAMED MATERIAL, SUCH AS WHIPPED CREAM

[75] Inventor: Helmut Koerfer, Camberg-Erbach, Fed. Rep. of Germany

[73] Assignee: F. Vaihinger GmbH & Co. Kommanditgesellschaft, Rodgau, Fed. Rep. of Germany

[21] Appl. No.: 388,491

[22] Filed: Jun. 14, 1982

[30] Foreign Application Priority Data

Jun. 24, 1981 [AT] Austria .................................. 2810/81

[51] Int. Cl.³ .............................................. B01F 15/06
[52] U.S. Cl. .................................... 366/144; 366/149; 165/47; 62/434; 62/437
[58] Field of Search ............................ 62/399, 434, 437; 222/146 C; 366/144, 145, 146, 149

[56] References Cited

U.S. PATENT DOCUMENTS 2,214,009  9/1940  Boester, Jr. ........................... 62/434
3,560,430  2/1971  Meyer et al. ..................... 366/149 X
3,865,276  2/1975  Thompson ....................... 222/146 C

FOREIGN PATENT DOCUMENTS 2536865 of 0000 Fed. Rep. of Germany .

Primary Examiner—Robert W. Jenkins
Assistant Examiner—Arthur D. Dahlberg
Attorney, Agent, or Firm—W. G. Fasse; D. H. Kane, Jr.

[57] ABSTRACT

A discharging nozzle for foamed material, especially whipped cream, is kept at a predetermined temperature even when a refrigeration machine which cools the device holding or producing the whipped cream is temporarily not operating. Thus, the discharge nozzle is kept substantially at the same temperature as the reservoir holding the whipped cream or as the machine producing the whipped cream. For this purpose the discharge nozzle is mounted in a solid cooled housing in heat transfer communication with a hollow jacket. The hollow jacket in turn is connected in heat communication to the device holding or producing the whipped cream. The hollow jacket is filled with a liquid which stores cold produced by refrigerating of the device holding or producing the whipped cream. The storing of the cold is accomplished by a change in the physical state of the liquid. The cold is then released to the nozzle during times when refrigeration is interrupted.

5 Claims, 3 Drawing Figures

APPARATUS FOR DISCHARGING FOAMED MATERIAL, SUCH AS WHIPPED CREAM

CLAIM TO PRIORITY

The present application is based on Austrian Ser. No. A 2810/81, filed in Austria on June 24, 1981. The priority of the Austrian filing data is claimed for the present application.

BACKGROUND OF THE INVENTION

The present invention relates to an apparatus for discharging foamed material, such as whipped cream or any other material that is conventionally used for decorating cakes or any other prepared food.

The invention may also be useful whereever a material to be discharged through a nozzle, requires cooling.

Such devices are known in many different versions. Generally, these devices comprise a discharge nozzle having a discharge opening, for example in the form of a star shape, to discharge the foam material such as whipped cream in a particular crosssectional pattern. The nozzle itself may be permanently attached to the storing or preparing apparatus or it may be exchangeable for different decorating effects or cleaning.

German patent publication No. 2,536,865 discloses an apparatus for producing a foam type whipped cream. In the apparatus disclosed in this prior art the foamed whipped cream is produced by means of a so-called narrow gap homogenizer. The operating stroke or whipping displacement is such a homogenizer is adjustable. The entire apparatus is mounted in a housing, preferably an insulated housing, so that it may be cooled in a simple and efficient manner. The decorating discharge nozzle through which the whipped cream is discharged, is connected to the whipped cream producing means inside the housing by a neck portion extending through an outlet port in the housing. Due to the fact that the decorating discharge nozzle is located outside of the housing, it has been a problem heretofore that the temperature of the decorating discharge nozzle is frequently higher than the cooling temperature inside the housing, especially when whipped cream has not been discharged through the nozzle for a prolonged period of time. Such higher temperature of the nozzle may have the result that a portion of the whipped cream remaining in the nozzle from the preceding use becomes liquid and thus interfers at least initially with the decoration when the apparatus is used again. Thus, it has been the custom, to first discharge a quantity of the whipped cream which is usually wasted.

OBJECTS OF THE INVENTION

In view of the above it is the aim of the invention to achieve the following objects singly or in combination:

to provide an apparatus for manufacturing and/or discharging a foam type material such as whipped cream at a constant temperature, even at the decorating nozzle;

to effectively cool the discharge nozzle of a foamed material discharge apparatus at all times, thereby using the cooling means of the apparatus which produces or contains the foamed material such as whipped cream; and to construct the neck through which the discharge nozzle is secured to the device which provides the whipped cream in such a manner that it is easily removable for cleaning and maintenance purposes or for exchanging the nozzle.

SUMMARY OF THE INVENTION

In order to maintain the discharge nozzle of an apparatus as described above at a constant temperature substantially at all times, the invention provides that the components of the apparatus located outside of the housing of the device which stores or produces the whipped cream, especially the decorating nozzle, is mounted in a neck provided with a heat conducting tubular jacket leading into the housing, whereby this jacket has a hollow portion filled with a cooling liquid and a solid portion surrounding the discharge nozzle proper, preferably in a releasable and exchangeable manner. The cooling is accomplished by utilizing the conversion of the cooling liquid from one physical state to the other. This change to a frozen state out of the liquid state is accomplished by the refrigeration cold supplied to the jacket from the device which stores or produces the foamed material such as whipped cream. Such device has its own refrigeration means.

According to a suitable embodiment the whipping device extends also through the tubular jacket of heat conducting material but is spaced from the tubular jacket by an air gap in order to prevent the freeze-up of the whipping means which simultaneously supply the whipped cream to the discharge nozzle through a valve.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
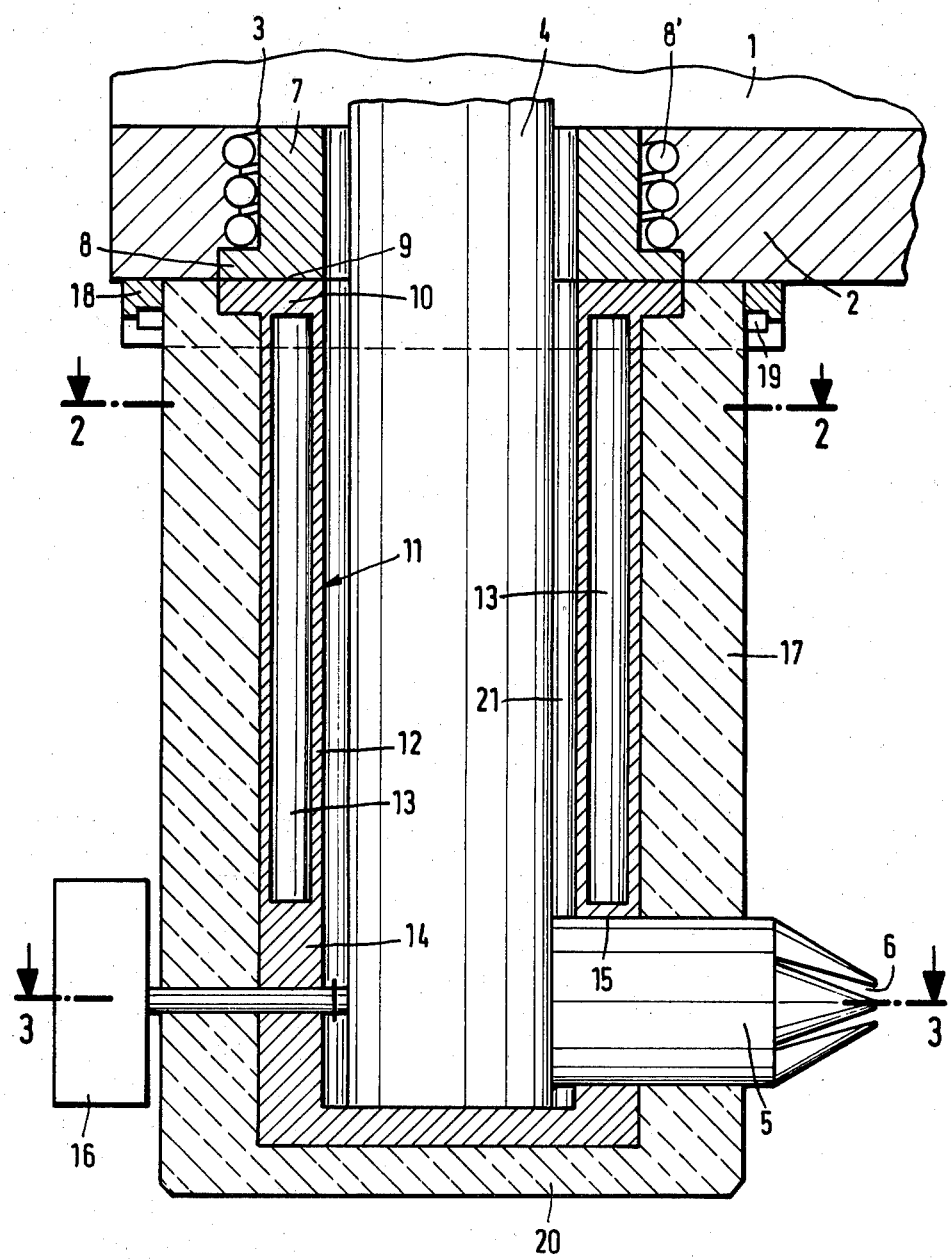
FIG. 1 is a sectional view through the neck and discharge nozzle portion of the heat conducting tubular jacket according to the invention for securing the discharge nozzle to a housing.

Referring to FIG. 1 the device which stores or produces the whipped cream is shown only as having a housing 1 with a housing wall 2 through which an outlet port 3 extends. A whipping means 4 also reaches out of the housing 1 through the port 3. The details of the whipping means 4 are not shown since they are part of the prior art. Whipping means 4 provide a passageway for the whipped cream to a discharge nozzle 5 having an outlet 6 for providing, for example, a star-shaped cross-section of the stream of whipped cream passing through the nozzle 5.

According to the invention the outlet port 3 is surrounded by a bushing 7 made of heat conducting material such as aluminum which in turn is surrounded by cooling ducts 8' connected to a refrigeration device not shown, but forming part of the whipped cream producing or storing apparatus. The bushing 7 is provided with a flange portion 8 which provides a sufficiently large surface area 9 for a heat or cold transfer contact with a similar flange portion 10 of the cooling means for the nozzle 5 according to the invention.

These cooling means comprise a tubular jacket 11 made of heat conducting material such as aluminum.

The tubular jacket 11 comprises a hollow jacket portion 12 forming a hollow space 13 and a solid jacket portion 14 also of heat conducting material. The solid jacket portion 14 provides a socket type opening 15 in which the decorating discharge nozzle 5 is exchangeably received.

The lower end of the whipping means 4 is equipped with conventional valve means not shown, but operable through a button 16 in a conventional manner for the discharge of the whipped cream through the nozzle opening 6.

The entire tubular jacket means 11 including the heat transfer flange 10 is surrounded by a casing 17 made of heat insulating material. The casing 17 may, for example, be connected to the wall 2 of the housing 1 by a conventional plug-in type connection such as a bayonet type clutch 18 which receives locking pins 19 rigidly secured to the casing 17. Further, the lower portion 20 of the jacket 17 may also be a separate component for easy access to the discharge nozzle 5 and for filling the space 13 in the tubular jacket portion 12 with a cooling liquid such as turpentine or rape oil.

Figure 2:
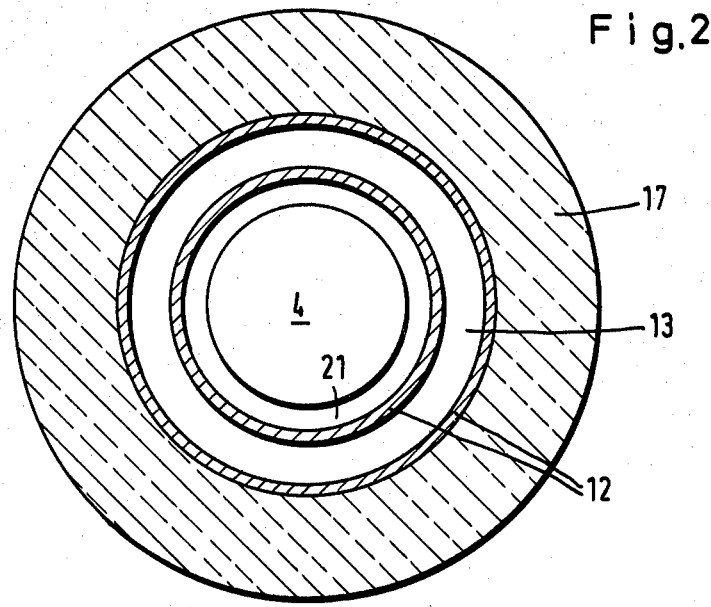
FIG. 2 is a sectional view along section line 2—2 in FIG. 1.
Figure 3:
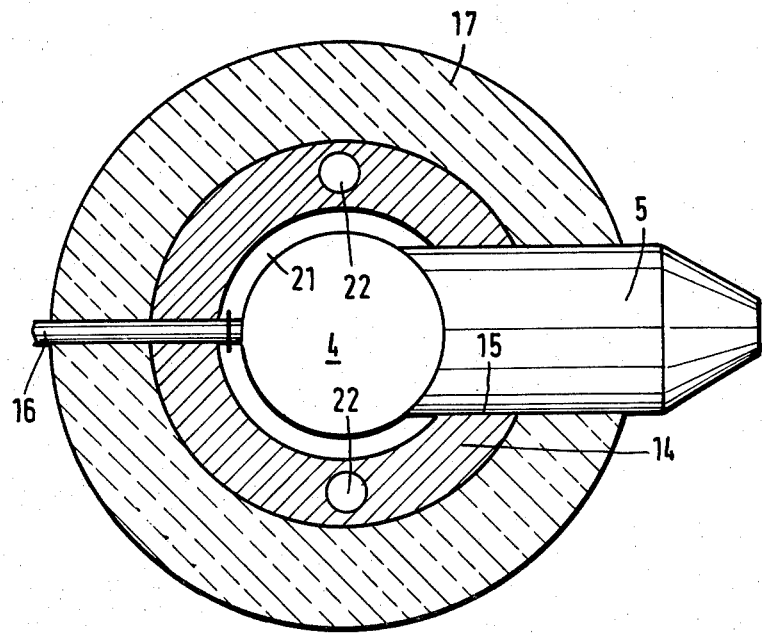
FIG. 3 is a sectional view along section line 3—3 in FIG. 1.

As shown in FIGS. 1, 2 and 3, the whipping means 4 are spaced from the inwardly facing surface of the tubular jacket means 11 by an air gap 21 to avoid a freeze-up of the whipping means 4 and the valve means mounted in the lower ends of the whipping means 4. The insulating casing 17 makes such that the cooling of the discharge nozzle 5 in socket 15 by the lower portion 14 of the cooling tubular jacket means is effective at all times even if the refrigerating ducts 8' are temporarily not being cooled.

Filling of the space 13 in the hollow jacket portion with a cooling liquid such as turpentine or rape oil may be accomplished through filling openings 22 passing, for example through the solid jacket portion 14 as shown in FIG. 3, and closed in a conventional manner not shown.

In operation, the cooling liquid in the space 13 is cooled down, for example, into its solid state by the cooling action of the refrigeration ducts 8' through the interface of the heat conducting flanges 8 and 10. A good heat contact will provide for an efficient storage of cold in the cooling liquid contained in the space 13 even if the refrigerating device of the apparatus in the housing 1 only runs for short periods of time. When the solidified cooling liquid in the space 13 melts again it will thereby effectively cool the nozzle 5 through the solid jacket portion 14. For example, if the temperature of the decorator discharge nozzle 5 is to be maintained at about 5° C. it has been found that turpentine is a suitable cooling liquid to be filled into the space 13. A temperature of about 10° C. may be maintained by using a filling of rape oil in the space 13. Thus, since the tubular jacket means are easily exchanged through the plug-in socket type coupling means 18, 19 it is possible to use different jacket means with different cooling liquids for different types of foamed material. For example, cake icing may require a higher temperature than whipped cream.

Incidentally, the operating button 16 may simultaneously actuate electrical circuits for the operation of the discharge valve and for the preparation or production of the whipped cream as is conventional.

As mentioned, the air gap 21 makes sure that the whipping means 4 do not freeze-up. The heat insulating casing 17 on the other hand makes sure that the cooling by the jacket is effective even over extended periods of time even if the refrigeration means in the housing 1 do not operate.

Although the invention has been described with reference to specific example embodiments, it will be appreciated, that it is intended, to cover all modifications and equivalents within the scope of the appended claims.

What is claimed is:

1. An apparatus for discharging a foamed material, such as whipped cream from a device holding or producing the whipped cream, comprising housing means for said device, outlet port means extending through a wall of said housing means, refrigeration means (8') for cooling said housing means, foamed material discharge nozzle means, heat conducting tubular jacket means mounting said discharge nozzle means to said housing means for supplying foamed material through said outlet port means to the discharge nozzle means, said heat conducting tubular jacket means comprising a hollow jacket portion (12) forming a chamber holding a cooling liquid, and a solid jacket portion (14) mounting said discharge nozzle means, said hollow jacket portion being in cooling heat transfer contact with said refrigeration means, said hollow jacket portion being further in cooling heat transfer contact through said solid jacket portion with said discharge nozzle means so that the discharge nozzle means (5) is cooled by cold stored in said cooling liquid which thereby changes its physical state when said refrigeration means are temporarily inoperative.

2. The apparatus of claim 1, wherein said refrigeration means (8') extend into said outlet port means, and wherein said hollow jacket portion (2) has a flange mounted to said outlet port means in heat or cold transfer contact with said refrigeration means.

3. The apparatus of claim 1 or 2, further comprising heat insulating casing means (17) operatively surrounding said heat conducting tubular jacket means (11).

4. The apparatus of claim 1 or 2, further comprising whipping means (4) extending through said outlet port means and into said tubular jacket means substantially to said discharge nozzle means, said whipping means being spaced from an inner surface of said tubular jacket means to provide an air gap (21) for preventing a freeze-up of said whipping means.

5. The apparatus of claim 4, further comprising heat insulating casing means (17) operatively surrounding said heat conducting tubular jacket means (12,14) and said whipping means (4).

* * * * *